United States Patent [19]
McCormick

[11] 3,979,804
[45] Sept. 14, 1976

[54] SNAP RING GROOVE VENTS

[76] Inventor: Eugene C. McCormick, P. O. Box 706, Wellington, Kans. 67152

[22] Filed: Dec. 24, 1974

[21] Appl. No.: 536,214

[52] U.S. Cl. ................................. 24/256; 74/603; 85/8.8; 308/DIG. 11
[51] Int. Cl.² ..................... F16C 3/00; A44B 21/00
[58] Field of Search ............ 285/114; 85/5 CP, 8.8; 74/603; 29/201; 308/DIG. 11, 237; 24/256

[56] References Cited
UNITED STATES PATENTS

| | | | |
|---|---|---|---|
| 2,426,874 | 9/1947 | Hasbrouck et al. | 74/603 |
| 2,494,569 | 1/1950 | McMaster | 74/603 UX |
| 2,552,166 | 5/1951 | Gardiner | 308/DIG. 11 UX |
| 2,950,132 | 8/1960 | Kocsuta | 85/8.8 X |
| 3,347,293 | 10/1967 | Clark | 85/8.8 X |
| 3,835,728 | 9/1974 | Bernard | 74/603 |

Primary Examiner—Donald A. Griffin
Attorney, Agent, or Firm—John H. Widdowson

[57] ABSTRACT

The invention is a ventilated snap-ring groove in a machine housing subjected in operation to vibration. An aperture therein has a snap-ring groove. A conduit in the housing or the like communicates between the groove, and a point exterior of the housing or the like. The housing is, for example, an aircraft engine crankshaft counterweight.

6 Claims, 6 Drawing Figures

SNAP RING GROOVE VENTS

BACKGROUND OF THE INVENTION

The invention is related to structures having spring ring grooves therein for mounting spring rings; and in particular, ventilators for such grooves. Spring rings are well known in the prior art and are widely used for retaining machine parts or the like in normal operating position in a machine structure, such as a housing or the like. The term spring ring is essentially synonymous with the term snap ring as it is used herein. In practice, spring rings are often referred to as snap rings. Prior art snap ring or spring ring assembly structures consist of an aperture in a housing or the like with a groove in the aperture extending into the housing material to in use mount an open ended ring which is constructed of a resilient material that when mounted in the groove rests in the groove in a circumferentially compressed condition and has its inner portion extending into the opening of the aperture. Generally these grooves are circular with the spring ring being circular in its exterior portions, so that it will fit in the groove and expand in the groove to retain itself in place. In use the prior art spring ring assemblies will gather particles of material and/or liquid in the groove between the ends of the spring ring, and these particles will wedge themselves between the circular portion of the spring ring and the groove when it is subjected to force loads or vibrations. These particles can dislodge the spring ring from its normal seated position when it is subjected to force loads or vibrations. In situations where the spring rings and associated structures are subjected to substantial vibration such as in internal combustion engines, the ring can be vibrated to such an extent that the ends of the ring will be raised from their seated position in the groove and particulate material will pass underneath the ring or between its peripheral portion in the groove thus displacing the spring ring from its normally seated position and eventually displacing it from the groove completely or putting it in a position to be easily displaced by vibrations. No prior art device is known which will prevent the buildup of particulate material in a spring ring groove so as to prevent the ring from being highly agitated or forced from its normal seated position when the structure is subjected to vibrational forces.

SUMMARY OF THE INVENTION

In one such specific embodiment, a structure includes a housing in the form of an engine counterweight having an aperture therethrough with a spring ring groove in the aperture and further having a ventilator in the form of a conduit communicably connected with the groove for venting same. The ventilator includes a conduit having the inlet end portion thereof communicably connected with a peripheral portion of the groove and having the outlet portion thereof communicably connected with an exterior portion of the counterweight to in use pass fluids and particulate material from the groove to the exterior of the counterweight structure. The specific structure shown herein is a weight for a bifilar-type centrifugal pendulum, or more particularly a counterweight for the crankshaft assembly of an air-cooled engine using a bifilar-type centrifugal pendulum for control of torsional vibration.

One object of this invention is to provide a vent for a snap ring or spring ring assembly overcoming the aforementioned disadvantages of the prior art devices.

Still, one other object of this invention is to provide a vent structure for the ring mounting groove of a spring or snap ring assembly in a housing or the like which has an aperture with a groove therein for mounting a spring ring wherein; the vent structure having an inlet communicably connected with the groove, and having an outlet communicably connected with an exterior portion of the housing or the like.

Still, another object of this invention is to provide a ventilator for the spring ring groove in a crankshaft assembly counterweight for an engine wherein the spring ring groove is vented to an exterior peripheral portion of the counterweight.

Various other objects, advantages, and features of the invention will become apparent to those skilled in the art from the following discussion, taken in conjunction with the accompanying drawing, in which:

Figure 1:
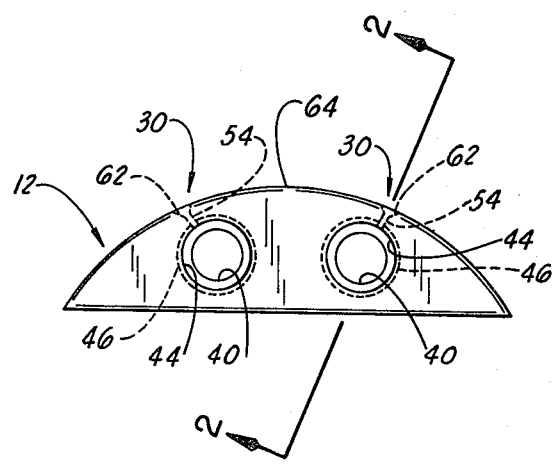
FIG. 1 is an elevation view of one side of a crankshaft assembly counterweight for an internal combustion engine with the spring rings removed and showing in dashed lines the spring ring grooves an the vents.

The following is a discussion and description of preferred specific embodiments of the snap ring groove vents of this invention, such being with reference to the drawing, whereupon the same reference numerals are used to indicate the same or similar parts and/or structure. It is to be understood that such discussion and description is not to unduly limit the scope of the invention.

DESCRIPTION OF PREFERRED EMBODIMENTS

Figure 5:
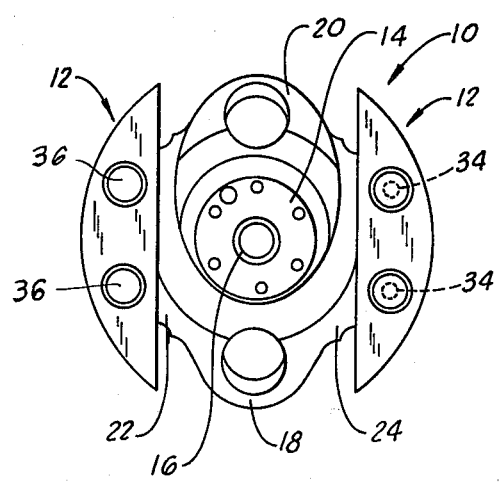
FIG. 5 is an end elevation view of the crankshaft of an internal combustion engine, having counterweights as shown in FIG. 1 mounted thereon.

Referring to the drawing, and in particular to FIG. 5 showing a crankshaft assembly, indicated generally at 10, with a pair of counterweights 12 mounted thereon. The crankshaft assembly 10 including the counterweights 12 is one specific structure utilizing snap rings or spring rings as a part of the structure and on which the groove vents of this invention can be used. In the crankshaft assembly 10 the counterweights 12 are retained on the crankshaft structure by pins that are retained in position by the spring rings or snap rings which are mounted in the counterweights. It is to be understood that the description of this invention is illustrated by reference to and by way of example of the counterweights on the crankshaft assembly of a reciprocating internal combustion engine; however, it is to be understood that the snap ring groove vents of this invention can be applied to any structure having a spring ring groove therein which can be vented. For example, the snap ring groove vents of this invention can be used on housing structures which retain bearings by snap ring assemblies; bearing assemblies where portions thereof are retained by snap ring assemblies; and movable sub assemblies of a machine which use snap ring assemblies to retain some element(s) in an operating position.

In the balancing of a reciprocating internal combustion-type engine the reciprocating motion thereof requires dampening of torsional vibration in the crankshaft assembly. One type of torsional vibration dampening is accomplished by using a pendulum structure, and specifically, a bifilar-type pendulum structure which has the pendulum weights attached to the crankshaft to move in accordance with the vibrational characteristics of the engine. As the crankshaft assembly 10 rotates in normal operation of the engine, the pendulum weights or counterweights 12 are moved by the influence of vibrational forces in the engine and function to dampen the torsional vibration of the crankshaft assembly. The crankshaft assembly 10 shown in FIG. 5 is for an opposed cylinder air-cooled aircraft engine; it has several pairs of the counterweights mounted thereon at several points along the crankshaft. FIG. 5 shows the crankshaft assembly from the propellor mounting end thereof. The propellor mounting flange 14 is on the end of the forwardmost end of the crankshaft just ahead of its forwardmost journal. An aperture 16 extends into the forward end of the crankshaft. The crankshaft piston rod mounting throws 18 and 20 are positioned in an opposed relation on opposite sides of the crankshaft's elongated rotating axis. The counterweights 12 are mounted on flanges 22 and 24 that extend from the crankshaft and in an opposed relation on opposite sides of the crankshaft's rotating axis and in a perpendicular relation to the crankshaft piston rod mounting throws 18 and 20. Pins extend through the counterweights and through the flanges 22 and 24 and are retained in position by the snap rings in the counterweights.

Figure 2:
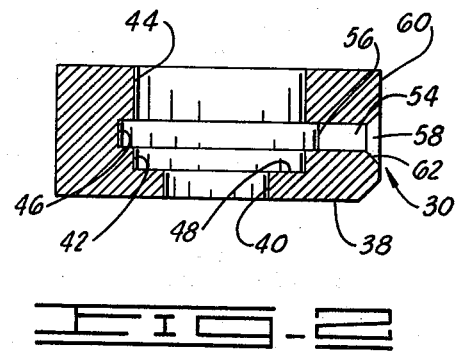
FIG. 2 is an enlarged sectional view of one side portion of the counterweight shown in FIG. 1, with the view taken on line 2—2 of FIG. 1.
Figure 3:
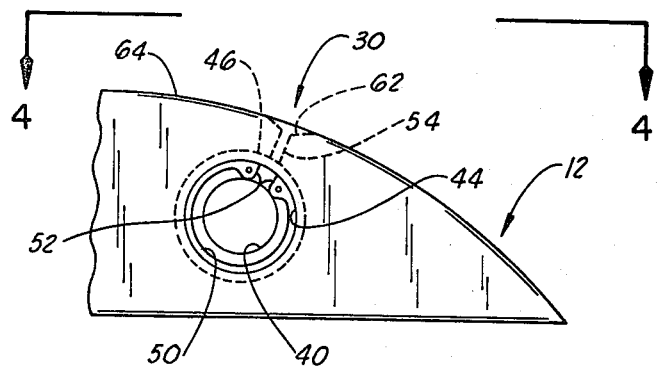
FIG. 3 is an enlarged elevation view of one side of one end portion of the counterweight shown in FIG. 1 with a ring shown therein and having the vent and peripheral portion of the groove shown in dashed lines.
Figure 4:
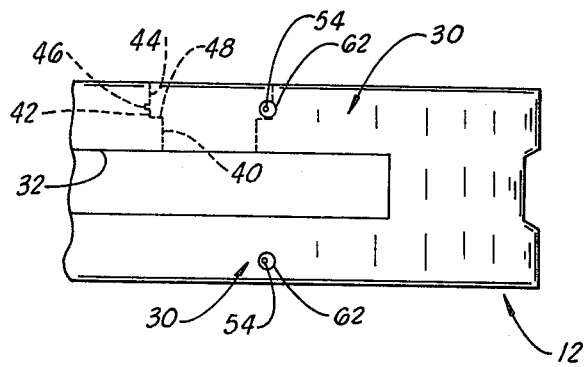
FIG. 4 is an elevation view of the crankshaft assembly counterweight shown in FIG. 1, the view taken on lines 4—4 of FIG. 3, with the aperture including the spring ring grooves shown in dashed lines.

A counterweight 12 is shown in FIG. 1 with the snap ring groove vents indicated generally at 30 and shown in dashed lines and detail portions of the counterweight shown in detail in FIGS. 2, 3, and 4. The counterweight 12 is constructed as shown from a single piece of material with a slot 32 formed through the center portion thereof and with two pairs of apertures therethrough transversely relative to the slot 32. The two pairs of apertures are used to mount the counterweight 12 on the crankshaft assembly and each aperture has a groove formed therein for mounting a snap ring or spring ring. The counterweights are mounted with the crankshaft flange extending into the slot and the pins extending through the apertures of the counterweight and the flange. A disc in inserted in each aperture between the end of the pin and the snap ring. FIG. 5 shows the counterweights 12 in place on a crankshaft with the pins shown in dashed lines and indicated at 34 and the discs indicated at 36.

FIG. 2 shows one side portion of a counterweight in a section view taken through the snap ring groove vent 30. The inner surface of the slot 32 through the center portion of the counterweight is indicated at 38 and appears in the lower portion of FIG. 2. The smallest portion of the aperture is adjacent to the side 38 of the slot and is indicated at 40. The aperture's smallest portion 40 receives the end mounting pin 34 when the counterweight 12 is mounted. The remainder of the aperture is a larger diameter than the smallest portion 40 and it is separated into an inner portion 42 and an outer portion 44 by the grooves 46. A shoulder 48, between the smallest portion 40 and the aperture's inner portion 42, is in use used to support the disc 36. The groove 46 is generally cylindrical and extends into the counterweight with its peripheral portion substantially spaced from the wall of the aperture. The several portions of the aperture are cylindrical and concentric about the same axis. The groove 46 is shaped as shown to accommodate and retain a snap ring or spring ring in the conventional manner. FIG. 3 shows a snap ring or spring ring 50 in the groove 46 of one end portion of the counterweight 12 with the ring having the ends thereof indicated at 52.

The snap ring groove vent 30 is shown in the right-hand portion of FIG. 2. The snap ring groove vent 30 includes a conduit portion 54, having the inlet end portion thereof 56 communicably connected with a peripheral portion with the spring ring groove 46 and the outlet portion thereof 58 communicably connected with the counterweights exterior surface 60. The vent's outlet end portion 58 has a divergent or beveled end portion 62 tapering outward from the conduit portion thereof 54. Preferably, the snap ring groove vent 30 is constructed as shown in FIG. 2, with the inlet portion 56 and conduit portion 54, being formed into the counterweight material in an integral fashion, such as by drilling and having the inlet portion 56 and the conduit portion 54 being essentially the same diameter. Preferably, the inlet portion 56 has a diameter equal to the width of the snap ring groove 46. Referring to FIG. 1, it is to be noted that the snap ring groove vents 30 are preferably drilled or bored into the counterweight with the elongated axis of the conduit portion 54 thereof being in one with the radius of the peripheral surface portion 64 of the counterweight.

Figure 6:
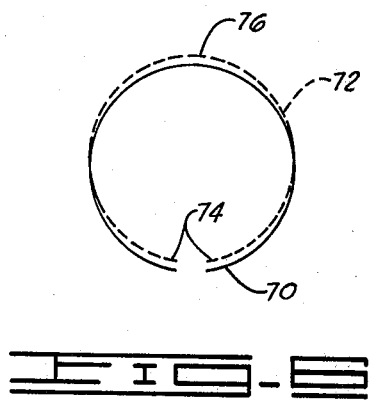
FIG. 6 is a node diagram illustrating in the solid line the normal position of the spring ring, and in the dashed line, the position of the ring in a vibrated state.

The motions of a ring in the groove in the counterweight 12 and the ring alone have been observed when they are subjected to vibrational forces. FIG. 6 is a node diagram illustrating the motion of a snap ring when subjected to vibrational forces. The solid line 70 indicates the normal or unvibrated position of the ring, and the dashed line indicates the shape of the ring when it is subjected to vibrational forces. In the unvibrated condition, the outer peripheral edge of the ring rests firmly in the perimeter or deepest part of the groove, and it is held in place by its inherent spring-like action because it is compressed. When the counterweight 12 and spring ring 50 are subjected to vibrational forces the ring deformes and the free ends 52 tend to move inward relative to the center of the ring as indicated at 74 in FIG. 6. The portion of the spring ring opposite the free ends and indicated at 76 is displaced slightly as the free ends move inward and away from their seated position in the groove. When the ring is in the groove in counterweight and vibrated substantially at its natural frequency then the free ends 52 will move inward sufficiently to be displaced from the groove in the absence of the spring ring vents of this invention. When an unvented counterweight is in an operating engine, and the engine is operated at a speed which will vibrate the ring at or substantially at its natural frequency, the ring will move as described and allow oil and particulate material such as metal grindings, dirt, oil sludge, and so forth, to pass underneath it or between it and the peripheral portion of the groove, thereby further displacing the ring from its normal position in the groove. Additionally, it has been observed that a counterweight without the snap ring groove vents 30, when vibrated, not necessarily at its natural frequency, will cause the ring to rotate in the groove. It has been observed in laboratory tests that when the counterweight 12 having the snap ring groove vents 30 is vibrated at frequencies which are not its natural frequency, and at frequencies which are its natural frequency, the ring will not rotate or be displaced in the spring ring groove; instead, it will align with its free ends 52 on opposite sides of the groove vent 30, as shown in FIG. 3, thereby allowing oil and particulate material to pass between the free ends of the snap ring and through the groove vent 30 to the exterior peripheral portion 64 of the counterweight 12 in the following example are the results of tests made with a particular internal combustion engine counterweight that illustrate the specific function and operation of the snap ring groove vents of this invention.

EXAMPLE

This example deals with the analysis of vibrating characteristics of the above described engine counterweight and observation of the counterweight, when studied in a sound generator. The specific counterweight used was taken an IO-470 series aircraft engine manufactured by the Continental Motors Corporation of Muskegon, Mich. The physical appearance of the counterweight is substantially as shown in the drawings. First, a snap ring or spring ring of the type normally used with these counterweights was studied in the sound generator, wherein it was vibrated and the frequencies of 220, 440, 880, etc., cps were observed as significant, with the frequency of 880 cps being the most violent. The ring was excited at temperatures ranging from approximately room temperature to approximately 400°F with no distinguishable difference in frequency response relative to the temperature changes being observed. At the termination of the tests, it was observed that the ring was magnetic, whereas it was not before the tests. Next, the rings were studied when mounted in the counterweight. It was also observed that when vibrating, the ring rotates in the groove and does not remain in any particular position for any substantial period of time. The counterweight was bombarded with sound energy in a dry static condition and in an oil bath in a static condition, and it was observed that the frequency response of the ring was essentially the same. The counterweight was set up in a centrifuge in an oil bath, and bombarded with sound energy of various frequencies. The counterweight was positioned in approximately the same attitude as it would normally operate in the engine. When spinning counterweight at 1600 rpm and subjecting it to frequencies 440, 880 and 1760 cps, it was noted that the 880 cps response was much greater than the 440 cps response, and at a frequency of 1760 cps, the snap ring vibrated violently and was thrown from the trailing edge of the counterweight, with the counterweight supporting pin being thrown in the forward direction. At the 1760 cps frequency vibration, 9 decibles (Db), was required to excite the ring, and it was thrown from the groove at 85 Db. It is believed that the cause for throwing the ring from the counterweight is oleoplaning, associated with frequency-induced vibration of the ring, and the centrifugal-induced oil pressure under the outer edge of the ring between it and the groove. A paste consisting of small metal particles and oil sludge was placed in the groove between the free ends of the ring and adjacent to interior portions of the ring, then the counterweight was rotated and subject to sound vibrations. It was observed that a substantial quantity of the paste remained in the groove and under the ring or between it and the peripheral portion of the groove. It is to be noted that the 1760 cps frequency has been observed after much study of the identified series of engines as being a prevalent frequency in the engine, particularly in the vibrating frequencies of the cylinders, and the propellor pitch control servo system, when operating at 2200 R.P.M.

A counterweight having the snap ring groove vents as shown and described hereinabove, was tested the same as the unvented counterweight just described. The counterweight had a drilled hole therein of 0.042 inch in diameter, positioned as shown in the drawings including the divergent outlet end portion. When the vented counterweight was subjected to the sound bombardment in the dry static condition, the ring had the same frequency response characteristics as were exhibited by the ring in the unvented counterweight. When the vented counterweight was rotated in the oil bath at 1600 rpm and subjected to sound energy bombardment at the 1760 cps frequency, 27 Db was required to excite the snap ring, and at 100 Db (the limit of the sound generator machine) the ring could not be thrown from the counterweight. In further testing, the gap of the ring was placed in several positions around the perimeter of the groove, and it was found that when the counterweight and ring were subjected to sonic vibrations, in rotating conditions, the ring would rotate to position the gap thereof on opposite sides of the inlet to the ring groove vent. Additionally, the snap ring groove vent was tested for its ability to remove fluid and particulate material from the groove. A paste consisting of small metal particles and oil sludge was placed in the groove. At approximately 400 rpm, the metal paste was forced through the snap ring groove vent and discharged from the outlet in a direction away from the counterweight. With the vented counterweight, rotating at approximately 400 rmp. approximate pressure measurements were made of the oil being expelled through the vent with the pressure being found to be approximately 2.5 pounds per sq. in. In the rotational test, no substantial unbalancing effect was noted from the jettison of the oil from the counterweight. It is believed that oil jettisoned from the counterweight may have a stabilizing effect on the crankshaft assembly by increasing the dampening effect of the counterweight or bifilar-type pendulum weight.

In the manufacture of the snap ring, groove vents of this invention, it is obvious that the vents can be constructed in any suitable housing to vent the groove of a spring ring assembly to achieve the end product and function of venting the spring ring groove to prevent vibrational forces from affecting the spring ring and to prevent the buildup of unwanted materials in the spring ring groove. In the manufacture of the snap ring groove vents of this invention, it is obvious the vents can be entirely constructed in a housing or the like as exampified by the counterweight assembly, or they can be formed in the housing with the inlet communicably connected with the perimeter with the spring ring groove and the outlet thereof connected with some external portion of the housing or the like.

In the use and operation of the snap ring groove vents of this invention, it is seen that same provides a simple and efficient means of venting the groove of a spring or snap ring assembly. As illustrated by the examples, the groove vent efficiently removes particulate materials and fluid materials from the spring ring groove, expelling such at an external point on the assembly. Although the use of the snap ring groove vents is illustrated with an aircraft engine counterweight, it is to be understood that the groove vent of this invention can be used with other structures having spring ring assemblies, wherein the ring is retained in a groove in an aperture and where the groove can be vented for the discharge of material.

As will become apparent from the foregoing description of the the applicant's snap ring groove vent structure, relatively simple means have been provided to ventilate the groove of a snap ring groove assembly where the groove is formed in an aperture in a housing or the like. The snap ring groove vent structure is economical to incorporate into the housing or the like and it is simple in function, as well as being a contributing factor to safety where such is dependent upon retaining the ring in the groove. The snap ring groove vent structure is very functional to remove particulate materials and other materials from the groove of a snap ring assembly, which aids in retaining the ring in the proper position in the groove when the assembly is subjected to rotary motion and/or vibrational forces.

While the invention has been described in conjunction with specific embodiments thereof, it will be understood that this description is intended to illustrate and not to limit the scope of the invention, which is defined by the following claims.

I claim:

1. In a centrifugal pendulum weight subjected to vibration in use and having an aperture constructed, shaped and adapted to mount a machine part therein, an improvement comprising:
   a. a snap ring to hold the machine part in place in the aperture;
   b. a snap ring groove in the periphery of the aperture for receiving said snap ring; and
   c. a conduit in said housing having an inlet and an outlet, said inlet communicably connected with the peripheral portion of said snap ring groove, and said outlet communicably connected with an exterior portion of the housing;
   said conduit constructed and adapted to pass fluid material and particulate material from said snap ring groove to the exterior portion of said housing keeping said snap ring and said snap ring groove clean and keeping said snap ring in said snap ring groove during the vibration of the centrifugal pendulum weight.

2. The improvement as described in claim 1, wherein:
   a. said conduit has a divergent outlet end portion, opening to said exterior portion of said pendulum weight;
   b. said snap ring groove is substantially circular end extends completely around the interior portion of said aperture; and
   c. said snap ring is open ended.

3. The improvement as described in claim 2, wherein:
   a. said pendulum weight is a bifilar-type centrifugal pendulum weight;
   b. said conduit outlet portion is communicably connected to an exterior portion of said bifilar-type centrifugal pendulum weight on a portion thereof peripheral to its direction of rotation; and
   c. said conduit is integrally formed in said bifilar-type centrifugal pendulum weight.

4. The improvement as described in claim 3, wherein:
   a. said conduit has a cross sectional area essentially equivalent to the cross sectional area of a circle, having a diameter equal to the depth of said groove at the juncture of said conduit and said snap ring groove;
   b. said bifilar-type centrifugal pendulum weight is essentially arcuate shaped in its exterior portion; and
   c. said conduit is essentially cylindrical and has its elongated axis radially disposed with respect to said essentially arcuate shaped exterior peripheral portion.

5. In a housing or the like subjected to vibration in use and having an aperture constructed, shaped and adapted to mount a machine part therein, the housing and the machine part further subjected to fluid lubrication during the operation thereof, an improvement comprising:
   a. a snap ring to hold the machine part in place in the aperture;
   b. a snap ring groove in the periphery of the aperture for receiving said snap ring; and
   c. a conduit in said housing, having an inlet and an outlet, said inlet communicably connected with the peripheral portion of said snap ring groove, said outlet communicably connected with an exterior portion of the housing;
   d. said conduit constructed and adapted to pass fluid lubricant with foreign particles suspended therein from said snap ring groove to the exterior portion of said housing keeping said snap ring and said snap ring groove clean and keeping said snap ring in place in said snap ring groove during the vibration of the housing.

6. The improvement as described in claim 5 wherein the housing and the machine part are a portion of an internal combustion engine which is subjected to vibration such as engines used in the aviation industry.

* * * * *